US012580818B2

(12) United States Patent
Ghalyan et al.

(10) Patent No.: US 12,580,818 B2
(45) Date of Patent: Mar. 17, 2026

(54) SYSTEMS AND METHODS FOR ANOMALY DETECTION IN SOFTWARE-DEFINED NETWORKS FROM OBSERVED HOST METRICS

(71) Applicant: JPMORGAN CHASE BANK, N.A., New York, NY (US)

(72) Inventors: Najah Ghalyan, Wayne, NJ (US); Amal Vaidya, London (GB); Mohammed Ayub, Jersey City, NJ (US); Andre Frade, London (GB); Sean Moran, London (GB)

(73) Assignee: JPMORGAN CHASE BANK, N.A., New York, NY (US)

( * ) Notice: Subject to any disclaimer, the term of this patent is extended or adjusted under 35 U.S.C. 154(b) by 0 days.

(21) Appl. No.: 18/405,498

(22) Filed: Jan. 5, 2024

(65) Prior Publication Data

US 2025/0227029 A1     Jul. 10, 2025

(51) Int. Cl.
| | |
|---|---|
| *H04L 41/0895* | (2022.01) |
| *H04L 41/0816* | (2022.01) |
| *H04L 41/147* | (2022.01) |
| *H04L 41/16* | (2022.01) |
| *H04L 41/40* | (2022.01) |

(52) U.S. Cl.
CPC ...... *H04L 41/0895* (2022.05); *H04L 41/0816* (2013.01); *H04L 41/147* (2013.01); *H04L 41/16* (2013.01); *H04L 41/40* (2022.05)

(58) Field of Classification Search
CPC . H04L 41/0895; H04L 41/0816; H04L 41/16; H04L 41/147; H04L 41/40
See application file for complete search history.

(56) References Cited

U.S. PATENT DOCUMENTS

2021/0409433 A1* 12/2021 Pallagatti Kotrabasappa ..............
H04L 63/0263
2023/0071606 A1* 3/2023 Kesavan ............. G06F 11/3409

* cited by examiner

*Primary Examiner* — Shirley X Zhang
(74) *Attorney, Agent, or Firm* — GREENBERG TRAURIG LLP

(57) ABSTRACT

Systems and methods for anomaly detection in software-defined networks from observed host metrics are disclosed. A method may include: (1) training a random forest model comprising a plurality of trees with historical metrics from a software defined network, the software defined network comprising a plurality of hosts; (2) receiving metrics for a plurality of features from the hosts in the software defined network; (3) providing the metrics to the trained random forest model; (4) receiving, from the trained random forest model, a prediction of an anomalous hosts for one of the hosts; (5) identifying a subset of the plurality of trees that contributed to the prediction; (6) generating feature scores for the feature from the subset of trees; (7) generating an anomaly score for the feature based on the feature scores and an explanation; and (8) executing an automated action in response to the anomaly score.

9 Claims, 4 Drawing Sheets

SYSTEMS AND METHODS FOR ANOMALY DETECTION IN SOFTWARE-DEFINED NETWORKS FROM OBSERVED HOST METRICS

BACKGROUND OF THE INVENTION

1. Field of the Invention

Embodiments relate to systems and methods for anomaly detection in software-defined networks from observed host metrics.

2. Description of the Related Art

Software Defined Networking (SDN) is a technology that is used to provide platforms for large technology infrastructures. SDN may use software-based controllers or application programming interfaces (APIs) to communicate with underlying hardware infrastructure and direct traffic on a network. Central to SDN is the virtualization of storage and compute provided by physical hosts and networking provided by physical switches and routers. This virtualization is a key enabler for triggering migration of workloads from one server to another, making SDN-based platforms more sustainable.

SDN-based platforms may include many different components that live in different layers, including physical hosts, virtual machines, and a network of data centers, fabrics, NSX-managers, racks, clusters, etc. The large number of components and the complicated relationships between them make the process of detecting anomalies in these components a real challenge.

The anomaly detection process is critically important for avoiding major outages that can cause issues/failure in the system that may produce prolonged operational downtime, which may have critical business impact with huge financial loss and reputation damage.

SUMMARY OF THE INVENTION

Systems and methods for anomaly detection in software-defined networks from observed host metrics are disclosed. According to an embodiment, a method may include: (1) training, by a computer program, a random forest model comprising a plurality of trees with historical metrics from a software defined network, the software defined network comprising a plurality of hosts; (2) receiving, by the computer program, metrics for a plurality of features from the hosts in the software defined network; (3) providing, by the computer program, the metrics to the trained random forest model; (4) receiving, by the computer program and from the trained random forest model, a prediction of an anomalous hosts for one of the hosts; (5) identifying, by the computer program and for the anomalous host, a subset of the plurality of trees that contributed to the prediction; (6) generating, by the computer program, feature scores for the feature from the subset of trees; (7) generating, by the computer program, an anomaly score for the feature based on the feature scores and an explanation; and (8) executing, by the computer program, an automated action in response to the anomaly score.

In one embodiment, the plurality of hosts comprise hardware in the software defined network.

In one embodiment, the historical metrics and the metrics may include central processing unit (CPU) metrics, disk usage metrics, memory metrics, networking metrics, and system performance metrics.

In one embodiment, the feature scores for the feature from the subset of trees are based on a location of the feature in each of the subset of trees. The feature score may be higher for a feature that is close to a root of the tree.

In one embodiment, the anomaly score may include an average of the feature scores.

In one embodiment, the automated action may include moving virtual machines from anomalous hosts to healthy hosts.

According to another embodiment, a system may include: a software defined network comprising a plurality of hosts; and an electronic device executing a computer program that may be configured to train a random forest model comprising a plurality of trees with historical metrics from the software defined network, to receive metrics for a plurality of features from the hosts in the software defined network, to provide the metrics to the trained random forest model, to receive, from the trained random forest model, a prediction of an anomalous hosts for one of the hosts, to identify a subset of the plurality of trees that contributed to the prediction, to generate feature scores for the feature from the subset of trees, to generate an anomaly score for the feature based on the feature scores and an explanation, and to execute an automated action in response to the anomaly score.

In one embodiment, the plurality of hosts comprise hardware in the software defined network.

In one embodiment, the historical metrics and the metrics comprise include central processing unit (CPU) metrics, disk usage metrics, memory metrics, networking metrics, and system performance metrics.

In one embodiment, the feature scores for the feature from the subset of trees are based on a location of the feature in each of the subset of trees. The feature score may be higher for a feature that is close to a root of the tree.

In one embodiment, the anomaly score may include an average of the feature scores.

In one embodiment, the automated action may include moving virtual machines from anomalous hosts to healthy hosts.

According to another embodiment, a non-transitory computer readable storage medium may include instructions stored thereon, which when read and executed by one or more computer processors, cause the one or more computer processors to perform steps comprising: training a random forest model comprising a plurality of trees with historical metrics from a software defined network, the software defined network comprising a plurality of hosts; receiving metrics for a plurality of features from hosts in the software defined network; providing the metrics to the trained random forest model; receiving, from the trained random forest model, a prediction of an anomalous hosts for one of the hosts; identifying, for the anomalous host, a subset of the plurality of trees that contributed to the prediction; generating feature scores for the feature from the subset of trees; generating an anomaly score for the feature based on the feature scores and an explanation; and executing an automated action in response to the anomaly score.

In one embodiment, the plurality of hosts comprise hardware in the software defined network.

In one embodiment, the historical metrics and the metrics comprise include central processing unit (CPU) metrics, disk usage metrics, memory metrics, networking metrics, and system performance metrics.

In one embodiment, the feature scores for the feature from the subset of trees are based on a location of the feature in each of the subset of trees. The feature score may be higher for a feature that is close to a root of the tree.

In one embodiment, the automated action may include moving virtual machines from anomalous hosts to healthy hosts.

BRIEF DESCRIPTION OF THE DRAWINGS

For a more complete understanding of the present invention, the objects and advantages thereof, reference is now made to the following descriptions taken in connection with the accompanying drawings in which.

DETAILED DESCRIPTION OF PREFERRED EMBODIMENTS

Figure 1:
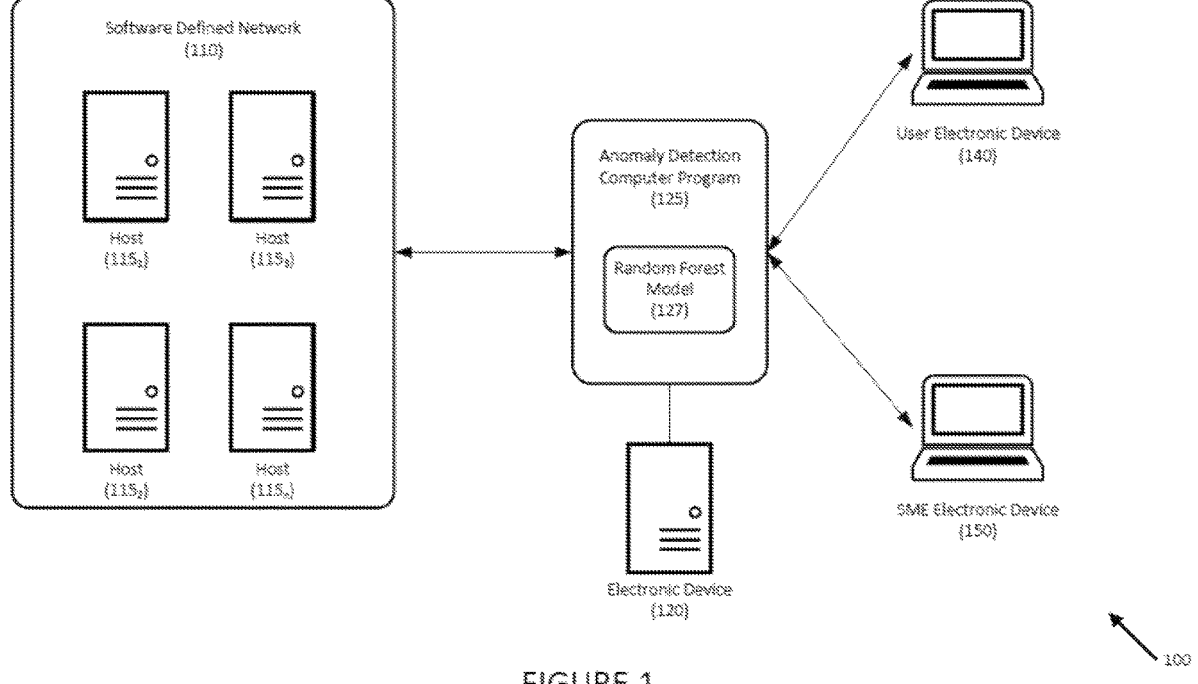
FIG. 1 illustrates a system for anomaly detection in software-defined networks from observed host metrics according to an embodiment.

Embodiments relate to systems and methods for anomaly detection in software-defined networks from observed host metrics.

Embodiments may collect metrics from hosts in the SDN-based platform. The hosts represent critical components of the SDN-based platform and have multiple metrics that can gauge platform performance from many perspectives. Examples include central processing unit (CPU) metrics (e.g., the number of provisioned CPU cores, core utilization, host's workload, CPU demand, contention, etc.), disk usage metrics (e.g., the amount of data read and written for the host's disks, disks' read and write latency, etc.), memory metrics (e.g., usable memory, memory usage percentage, compression and decompression rates, memory contention, host's demand, amount of shared memory, swap in/out rates, etc.), networking metrics (e.g., data received and transmitted rates, number and rates of received and dropped packets, I/O usage capacity, etc.), and overall system performance metrics (e.g., whether the host is on or off, amount of time in seconds that the system has been running since the last reboot, and whether certain services (e.g., vMotion) are enabled or disabled, etc.), and a summary (e.g., information on number of virtual CPUs of Virtual Machines (VMs) that are powered on, number of running VMs in the host, a number of vMotions for the host, etc.). These metrics may be used to gauge the SDN-based platform's performance from a plurality of angles, and any incident/fault can be potentially reflected on some of these hosts' metrics.

Embodiments add an artificial intelligence (AI) feature that makes SDN-based platform more sustainable by enabling an early control action that may help optimize storage and compute resources and avoid potential failure of SDN components.

Embodiments may use a Random Forest model that uses the hosts' metrics to estimate and predict platform anomalies and provide insights that may be helpful for anomaly diagnostics and mitigation. Traditional Random Forest models generally provide feature importance for a feature based on the power of the feature classifying the set of hosts used for training the model into healthy and anomalous hosts. Feature importance is static in the sense that it measures feature importance based on the data in the training dataset. Thus, once trained, the feature importance does not change.

In order to make feature importance dynamic, embodiments may provide a post-processing layer that may output feature importance scores for the features for each detected anomalous host. This may be accomplished by averaging feature scores provided by trees that contributed to the anomaly prediction. The feature importance scores may be used to rank the host's features based on their impact on the abnormal behavior during the operational phase.

Embodiments may provide an automated re-training pipeline that may trigger a re-training process during the operational phase when a sufficient number of labels are provided by Subject Matter Experts (SMEs) and there is a significant discrepancy between model's predictions and the SMEs labels. The re-training pipeline may facilitate starting with a good base model that can be enhanced over time and producing a high-performing and efficient model on the long term driven by SMEs feedback.

Examples of re-training platforms are disclosed in U.S. patent application Ser. No. 18,405,691 to Najah Ghalyan et al., entitled "Systems And Methods For Learning System Approach To Artificial Intelligence Models," filed concurrently herewith, the disclosure of which is hereby incorporated, by reference, in its entirety.

Embodiments may also enable a self-learning process that may account for time-varying characteristics of the SDN-based platform, for which a fixed model may not be optimal over time given the dynamically changing behavior of the SDN-based platform.

Referring to FIG. 1, a system for anomaly detection in software-defined networks from observed host metrics is disclosed according to an embodiment. System 100 may include software defined network 110, which may include a plurality of hosts (e.g., host $115_1$, host $115_2$, host $115_3$, . . . host $115_n$). Hosts 115 may include CPUs, memory, networking, etc.

Software defined network 110 may provide metrics for features of hosts 115 to anomaly detection computer program 125, which may be executed by electronic device 120. Electronic device 120 may be a server (e.g., physical and/or cloud-based), a computer, etc.

In one embodiment, electronic device 120 may be one of hosts 115.

Anomaly detection computer program 125 may receive the metrics (e.g., values) for certain features in the SDN. Examples of features and their metrics may include CPU metrics (e.g., the number of provisioned CPU cores, core utilization, host's workload, CPU demand, contention, etc.), disk usage (e.g., the amount of data read and written for the host's disks, disks' read and write latency, etc.), memory metrics (e.g., usable memory, memory usage percentage, compression and decompression rates, memory contention, host's demand, amount of shared memory, swap in/out rates, etc.), networking (e.g., data received and transmitted rates, number and rates of received and dropped packets, I/O usage capacity, etc.), and overall system performance (e.g., whether the host is on or off, amount of time in seconds that the system has been running since the last reboot, and whether certain services (e.g., vMotion) are enabled or disabled, etc.), and a summary (e.g., information on number of virtual CPUs of Virtual Machines (VMs) that are powered on, number of running VMs in the host, a number of vMotions for the host, etc.) from software defined network 110. In one embodiment, the hosts' metrics may be received from a monitoring software application that collects all metrics from different hosts generated by individual agents.

Anomaly detection computer program 125 may provide the metrics to random forest model 127, which may be a classifier that is trained to predict whether the metrics indicate that one of hosts 115 is healthy or anomalous. Anomaly detection computer program 125 may output the prediction as an anomaly score.

Subject Matter Experts (SME) electronic device 150 may provide labels to random forest model 127 that may be used in order to measure the model's performance and trigger model's retraining if needed.

Anomaly detection computer program 125 may output the prediction and the anomaly score to user electronic device 140. It may also output an anomaly explanation. The anomaly score and/or explanation may trigger certain actions, such as migrating tasks to other virtual machines and/or moving virtual machines from a host to another host (e.g., vMotion), etc.

Figure 2A:
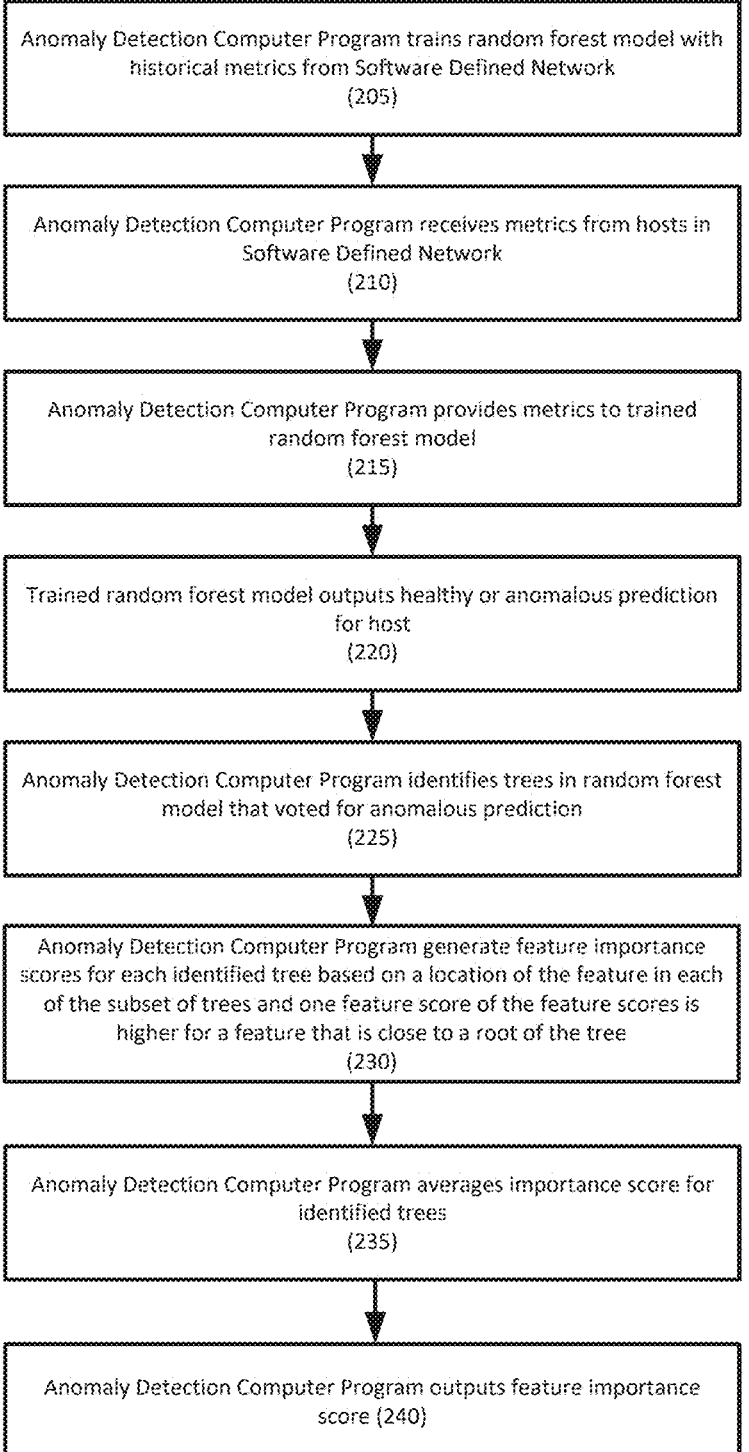
FIG. 2A illustrates a method for generating a features importance score that provides anomaly symptoms and insights for anomaly explanation according to an embodiment.

Referring to FIG. 2A, a method for anomaly detection and explanation in software-defined networks from observed host metrics is disclosed according to an embodiment.

In step 205, a computer program, such as an anomaly detection computer program, may train a random forest model with historical metrics from a software defined network. The training for anomaly detection may be supervised, while the training for the anomaly explanation provided by features importance score may be unsupervised.

The historical metrics may be from the same SDN, or from a SDN that has a similar behavior and/or environment.

In one embodiment, during training, the random forest model may be trained to identify metrics for features that may cause anomalous behavior. Examples of metrics may include values for uptimeLatest, hostDemand, hostUsage, numberRunningVMs, etc.

In one embodiment, each feature may be associated with a feature importance score. Based on the training data, the feature importance scores may be static.

In step 210, the anomaly detection computer program may receive metrics for features from hosts in the software defined network. In one embodiment, the metrics may include CPU metrics (e.g., the number of provisioned CPU cores, core utilization, host's workload, CPU demand, contention, etc.), disk usage metrics (e.g., the amount of data read and written for the host's disks, disks' read and write latency, etc.), memory metrics (e.g., usable memory, memory usage percentage, compression and decompression rates, memory contention, host's demand, amount of shared memory, swap in/out rates, etc.), networking metrics (e.g., data received and transmitted rates, number and rates of received and dropped packets, I/O usage capacity, etc.), overall system performance metrics (e.g., whether the host is on or off, amount of time in seconds that the system has been running since the last reboot, and whether certain services (e.g., vMotion) are enabled or disabled, etc.), and summary metrics (e.g., information on number of virtual CPUs of Virtual Machines (VMs) that are powered on, number of running VMs in the host, a number of vMotions for the host, etc.) from software defined network 110.

In step 215, the anomaly detection computer program may provide the metrics to the trained random forest model, and in step 220, the trained random forest model may output a healthy or anomaly prediction for the hosts in the SDN. In one embodiment, if multiple hosts from the same cluster are detected to be anomalous, this may be a symptom of a cluster-level issue. Similarly, if these anomalous hosts share the same switch or NSX-manager, this may be a symptom of a cluster-level issue. Thus, the anomalies of the hosts are detected, and these detections may be used to detect issues elsewhere in SDN components and may further identify the features that are causing the anomaly.

In step 225, the anomaly detection computer program may determine the importance of the features in the prediction. For example, the anomaly detection computer program may identify the trees in the random forest model that contribute to (e.g., voted for) the anomaly prediction. Trees that do not contribute to the anomaly prediction are not involved in the feature importance score calculation.

Each tree may have a feature score for each feature. For example, the feature score for each feature may be assigned to the feature based on whether the feature is in any part of the tree or not. If the feature is not in a tree, the feature score will be zero.

Figure 2B:
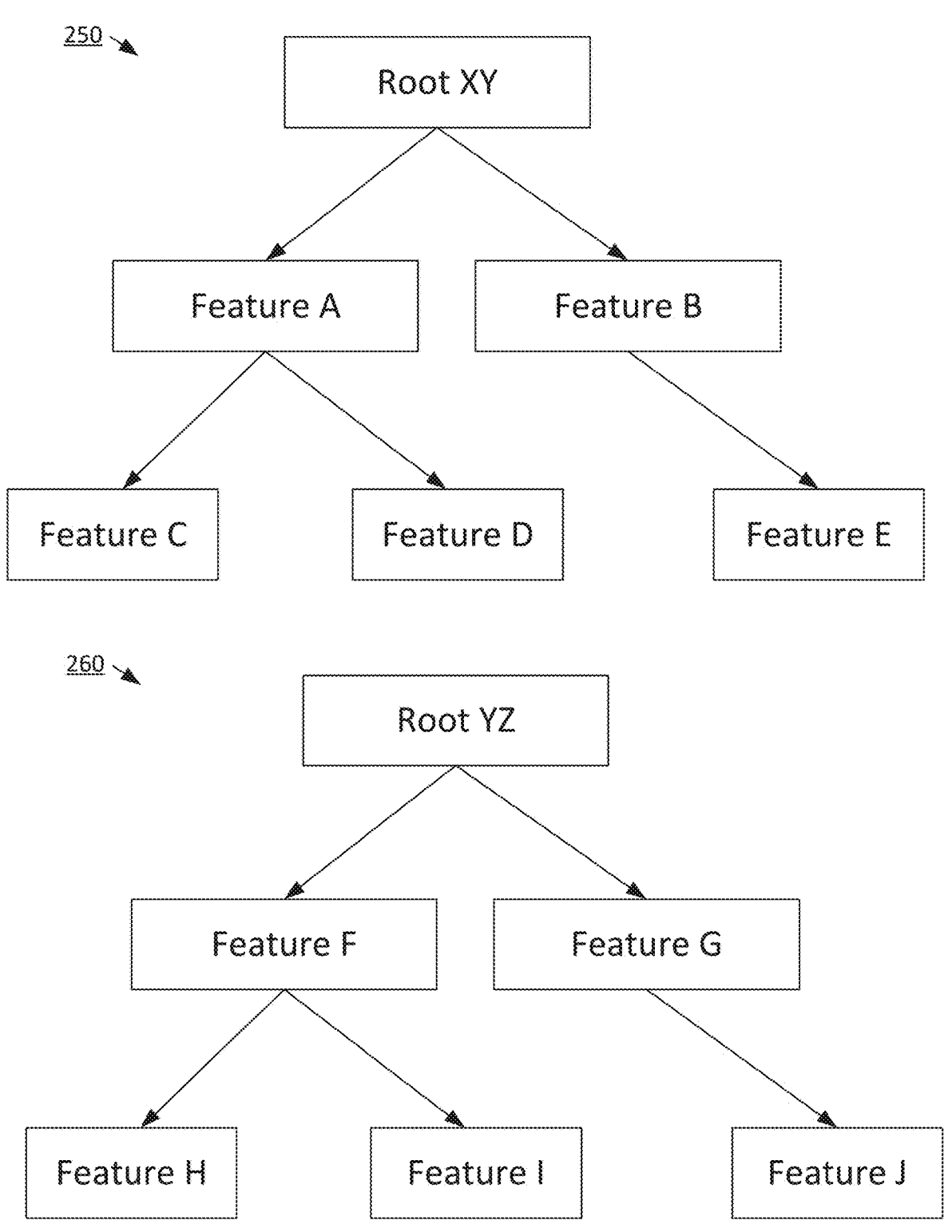
FIG. 2B illustrates decision trees for generating feature importance scores according to an embodient.

In step 230, the anomaly detection computer program may generate feature scores for the feature that contributed to the anomaly prediction for each identified tree. Referring to FIG. 2B which depicts decision trees for generating feature importance scores, in one embodiment, a non-negative feature importance score may be assigned to the feature based on how far/close the feature (e.g., features A, B, C, D, E, F, G, H, I, J) is from the root XY, YZ in trees 250, 260, respectively. For example, if the feature A, B, F, G is close to the root XY or YZ, indicating that the feature has a high impact on the anomaly prediction, the feature for the tree 250 or 260 may have a high feature importance score. If the feature C, D, E, H, I, J is not close to the root XY or YZ, the feature for the tree 250 or 260 may have a lower feature importance score. Two features (e.g., features C, f or features D, J) on different trees 250, 260 with the same distance from the root XY or YZ may have the same feature importance score.

In step 235, the anomaly detection computer program may average the feature importance scores for the feature from the identified trees, and in step 240, may output an anomaly score and an explanation to a user.

For example, the feature scores for each tree that voted for an anomaly prediction may be averaged into an anomaly score, and the features that contributed to the prediction may be ranked based on their anomaly scores. The features having the highest anomaly score may be output as an explanation of the anomaly.

In step 245, one or more automated actions may be taken. For example, in response to the anomaly score and explanation, a vMotion action may be triggered to move virtual machines from anomalous hosts to healthy hosts to avoid hosts failure and business interruption.

Figure 3:
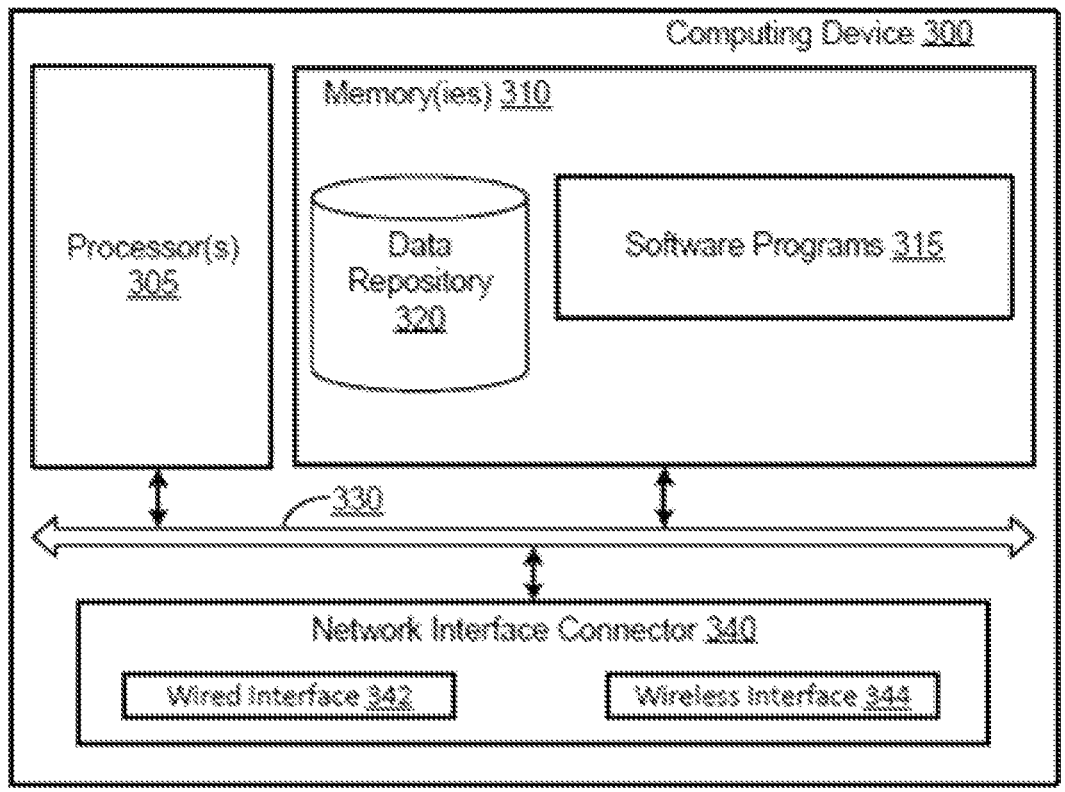
FIG. 3 depicts an exemplary computing system for implementing aspects of the present disclosure.

FIG. 3 depicts an exemplary computing system for implementing aspects of the present disclosure. FIG. 3 depicts exemplary computing device 300. Computing device 300 may represent the system components described herein. Computing device 300 may include processor 305 that may be coupled to memory 310. Memory 310 may include volatile memory. Processor 305 may execute computer-executable program code stored in memory 310, such as software programs 315. Software programs 315 may include one or more of the logical steps disclosed herein as a programmatic instruction, which may be executed by processor 305. Memory 310 may also include data repository 320, which may be nonvolatile memory for data persistence. Processor 305 and memory 310 may be coupled by bus 330. Bus 330 may also be coupled to one or more network interface connectors 340, such as wired network interface 342 or wireless network interface 344. Computing device 300 may also have user interface components, such as a screen for displaying graphical user interfaces and receiving input from the user, a mouse, a keyboard and/or other input/output components (not shown).

Hereinafter, general aspects of implementation of the systems and methods of embodiments will be described.

Embodiments of the system or portions of the system may be in the form of a "processing machine," such as a general-purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above. Such a set of instructions for performing a particular task may be characterized as a program, software program, or simply software.

In one embodiment, the processing machine may be a specialized processor.

In one embodiment, the processing machine may be a cloud-based processing machine, a physical processing machine, or combinations thereof.

As noted above, the processing machine executes the instructions that are stored in the memory or memories to process data. This processing of data may be in response to commands by a user or users of the processing machine, in response to previous processing, in response to a request by another processing machine and/or any other input, for example.

As noted above, the processing machine used to implement embodiments may be a general-purpose computer. However, the processing machine described above may also utilize any of a wide variety of other technologies including a special purpose computer, a computer system including, for example, a microcomputer, mini-computer or mainframe, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA (Field-Programmable Gate Array), PLD (Programmable Logic Device), PLA (Programmable Logic Array), or PAL (Programmable Array Logic), or any other device or arrangement of devices that is capable of implementing the steps of the processes disclosed herein.

The processing machine used to implement embodiments may utilize a suitable operating system.

It is appreciated that in order to practice the method of the embodiments as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above, in accordance with a further embodiment, may be performed by a single component. Further, the processing performed by one distinct component as described above may be performed by two distinct components.

In a similar manner, the memory storage performed by two distinct memory portions as described above, in accordance with a further embodiment, may be performed by a single memory portion. Further, the memory storage performed by one distinct memory portion as described above may be performed by two memory portions.

Further, various technologies may be used to provide communication between the various processors and/or memories, as well as to allow the processors and/or the memories to communicate with any other entity; i.e., so as to obtain further instructions or to access and use remote memory stores, for example. Such technologies used to provide such communication might include a network, the Internet, Intranet, Extranet, a LAN, an Ethernet, wireless communication via cell tower or satellite, or any client server system that provides communication, for example. Such communications technologies may use any suitable protocol such as TCP/IP, UDP, or OSI, for example.

As described above, a set of instructions may be used in the processing of embodiments. The set of instructions may be in the form of a program or software. The software may be in the form of system software or application software, for example. The software might also be in the form of a collection of separate programs, a program module within a larger program, or a portion of a program module, for example. The software used might also include modular programming in the form of object-oriented programming. The software tells the processing machine what to do with the data being processed.

Further, it is appreciated that the instructions or set of instructions used in the implementation and operation of embodiments may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments. Also, the instructions and/or data used in the practice of embodiments may utilize any compression or encryption technique or algorithm, as may be desired. An encryption module might be used to encrypt data. Further, files or other data may be decrypted using a suitable decryption module, for example.

As described above, the embodiments may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in embodiments may take on any of a variety of physical forms or transmissions, for example. Illustratively, the medium may be in the form of a compact disc, a DVD, an integrated circuit, a hard disk, a floppy disk, an optical disc, a magnetic tape, a RAM, a ROM, a PROM, an EPROM, a wire, a cable, a fiber, a communications channel, a satellite transmission, a memory card, a SIM card, or other remote transmission, as well as any other medium or source of data that may be read by the processors.

Further, the memory or memories used in the processing machine that implements embodiments may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the systems and methods, a variety of "user interfaces" may be utilized to allow a user to interface with the processing machine or machines that are used to implement embodiments. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, keypad, voice reader, voice recognizer, dialogue screen, menu box, list, checkbox, toggle switch, a pushbutton or any other device that allows a user to receive information regarding the operation of the processing machine as it processes a set of instructions and/or provides the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method, it is not necessary that a human user actually interact with a user interface used by the processing machine. Rather, it is also contemplated that the user interface might interact, i.e., convey and receive information, with another processing machine, rather than a human user. Accordingly, the other processing machine might be characterized as a user. Further, it is contemplated that a user interface utilized in the system and method may interact partially with another processing machine or processing machines, while also interacting partially with a human user.

It will be readily understood by those persons skilled in the art that embodiments are susceptible to broad utility and application. Many embodiments and adaptations of the present invention other than those herein described, as well as many variations, modifications and equivalent arrangements, will be apparent from or reasonably suggested by the foregoing description thereof, without departing from the substance or scope. Accordingly, while the embodiments of the present invention have been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications or equivalent arrangements.

What is claimed is:

1. A method, comprising:

training, by a computer program, a random forest model comprising a plurality of trees with historical metrics from a software defined network, the software defined network comprising a plurality of hosts;

receiving, by the computer program, metrics for a plurality of features from the hosts in the software defined network, wherein the historical metrics and the metrics comprise central processing unit (CPU) metrics, disk usage metrics, memory metrics, networking metrics, and system performance metrics;

providing, by the computer program, the metrics to the trained random forest model;

receiving, by the computer program and from the trained random forest model, a prediction of an anomalous host among one of the plurality of hosts;

identifying, by the computer program and for the anomalous host, a subset of the plurality of trees that contributed to the prediction;

generating, by the computer program, feature scores for the plurality of features from the subset of the plurality of trees, wherein the feature scores for the plurality of features from the subset of the plurality of trees are based on a location of each feature the subset of the plurality of trees and one feature score of the feature scores is higher for a feature that is close to a root of a tree of the subset of the plurality of trees;

generating, by the computer program, anomaly scores for the plurality of features based on the feature scores;

ranking, by the computer program, the plurality of features based on the anomaly score;

generating, by the computer program, an explanation based on a highest anomaly score of the anomaly scores;

persisting, by the computer program to a memory in communication with the computer program, feature importance scores for a plurality of anomalous hosts by averaging feature scores of the subset of the plurality of trees that contributed to the prediction, wherein the plurality of anomalous hosts includes the anomalous host;

triggering, by the computer program, a re-training pipeline for an artificial intelligence model based on the persisted feature importance scores;

re-training, by the computer program, the artificial intelligence model based on the re-training pipeline; and executing, by the computer program, an automated action in response to the anomaly score, the automated action comprising a vMotion that moves virtual machines from the anomalous host to one or more hosts of the plurality of hosts that is not the anomalous host.

2. The method of claim 1, wherein the plurality of hosts comprise hardware in the software defined network.

3. The method of claim 1, wherein the automated action comprises moving virtual machines from anomalous hosts to healthy hosts.

4. A system, comprising:

a software defined network comprising a plurality of hosts, the software defined network comprising a physical switch or a router and a storage and a processor; and an electronic device executing a computer program that:

to train a random forest model comprising a plurality of trees with historical metrics from the software defined network, to receive metrics for a plurality of features from the hosts in the software defined network, wherein the historical metrics and the metrics comprise central processing unit (CPU) metrics, disk usage metrics, memory metrics, networking metrics, and system performance metrics, to provide the metrics to the trained random forest model, to receive, from the trained random forest model, a prediction of host among one of the plurality of hosts, to identify a subset of the plurality of trees that contributed to the prediction, to generate feature scores for the plurality of features from the subset of the plurality of trees, wherein the feature scores for the plurality of features from the subset of the plurality of trees are based on a location of each feature the subset of the plurality of trees and one feature score of the feature scores is higher for a feature that is close to a root of a tree of the subset of the plurality of trees, to generate an anomaly score for the feature based on the feature scores, to rank the plurality of features based on the anomaly score;

to generate an explanation based on a highest anomaly score of the anomaly scores;

to persist, in a memory in communication with the processor, feature importance scores for a plurality of anomalous hosts by averaging feature scores of the subset of the plurality of trees that contributed to the prediction, wherein the plurality of anomalous hosts includes the anomalous host;

to trigger a re-training pipeline for an artificial intelligence model based on the persisted feature importance scores;

to re-train the artificial intelligence model based on the re-training pipeline; and to execute an automated action in response to the anomaly score, the automated action comprising a vMotion that moves virtual machines from the anomalous host to one or more hosts of the plurality of hosts that is not the anomalous host.

5. The system of claim 4, wherein the plurality of hosts comprise hardware in the software defined network.

6. The system of claim 4, wherein the automated action comprises moving virtual machines from anomalous hosts to healthy hosts.

7. A non-transitory computer readable storage medium, including instructions stored thereon, which when read and executed by one or more computer processors, cause the one or more computer processors to perform steps comprising:

training a random forest model comprising a plurality of trees with historical metrics from a software defined network, the software defined network comprising a plurality of hosts, the software defined network comprising a physical switch or a router and a storage and a processor, wherein the historical metrics and the metrics comprise central processing unit (CPU) metrics, disk usage metrics, memory metrics, networking metrics, and system performance metrics;

receiving metrics for a plurality of features from hosts in the software defined network;

providing the metrics to the trained random forest model;

receiving, from the trained random forest model, a prediction of an anomalous host among one of the plurality of hosts;

identifying, for the anomalous host, a subset of the plurality of trees that contributed to the prediction;

generating feature scores for the plurality of features from the subset of the plurality of trees, wherein the feature scores for the plurality of features from the subset of the plurality of trees are based on a location of each feature the subset of the plurality of trees and one feature score of the feature scores is higher for a feature that is close to a root of a tree of the subset of the plurality of trees;

generating an anomaly score for the feature based on the feature scores, ranking the plurality of features based on the anomaly score;

to generate an explanation based on a highest anomaly score of the anomaly scores;

persisting, in the on-transitory computer readable storage medium in communication with the one or more computer processors, feature importance scores for a plurality of anomalous hosts by averaging feature scores of the subset of the plurality of trees that contributed to the prediction, wherein the plurality of anomalous hosts includes the anomalous host;

triggering, by the computer program, a re-training pipeline for an artificial intelligence model based on the persisted feature importance scores;

re-training, by the computer program, the artificial intelligence model based on the re-training pipeline; and executing an automated action in response to the anomaly score, the automated action comprising a vMotion that moves virtual machines from the anomalous host to one or more hosts of the plurality of hosts that is not the anomalous host.

8. The non-transitory computer readable storage medium of claim 7, wherein the plurality of hosts comprise hardware in the software defined network.

9. The non-transitory computer readable storage medium of claim 7, wherein the automated action comprises moving virtual machines from anomalous hosts to healthy hosts.

*    *    *    *    *